(12) United States Patent
Eldada

(10) Patent No.: US 9,964,833 B2
(45) Date of Patent: *May 8, 2018

(54) PLANAR BEAM FORMING AND STEERING OPTICAL PHASED ARRAY CHIP AND METHOD OF USING SAME

(71) Applicant: Quanergy Systems, Inc., Sunnyvale, CA (US)

(72) Inventor: Louay Eldada, Sunnyvale, CA (US)

(73) Assignee: Quanergy Systems, Inc., Sunnyvale, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/695,864

(22) Filed: Sep. 5, 2017

(65) Prior Publication Data

US 2018/0074384 A1 Mar. 15, 2018

Related U.S. Application Data

(63) Continuation of application No. 14/318,716, filed on Jun. 30, 2014, now Pat. No. 9,753,351.

(51) Int. Cl.
*G02F 1/01* (2006.01)
*G02F 1/29* (2006.01)
*G01S 7/481* (2006.01)

(52) U.S. Cl.
CPC ............ *G02F 1/292* (2013.01); *G01S 7/4814* (2013.01); *G01S 7/4817* (2013.01)

(58) Field of Classification Search
CPC ...... B82Y 20/00; G02B 6/12007; G02B 6/34; G02F 1/225; G02F 1/0147; G02F 2201/30; G02F 1/01
See application file for complete search history.

(56) References Cited

U.S. PATENT DOCUMENTS

| | | | |
|---|---|---|---|
| 3,781,552 A | 12/1973 | Kadrmas | |
| 5,132,843 A | 7/1992 | Aoyama et al. | |
| 5,210,586 A | 5/1993 | Grage et al. | |
| 5,455,669 A | 10/1995 | Wetteborn | |
| 5,543,805 A | 8/1996 | Thaniyavarn | |
| 5,552,893 A | 9/1996 | Akasu | |
| 5,682,229 A | 10/1997 | Wangler | |
| 5,898,483 A | 4/1999 | Flowers | |
| 6,765,663 B2 | 7/2004 | Byren et al. | |
| 6,891,987 B2 | 5/2005 | Ionov et al. | |
| 7,746,449 B2 | 6/2010 | Ray et al. | |
| 7,969,558 B2 | 6/2011 | Hall | |
| 8,125,367 B2 | 2/2012 | Ludwig | |

(Continued)

OTHER PUBLICATIONS

Guo et al., "InP Photonic Integrated Circuit for 2D Optical Beam Steering", Photonics Conference, Oct. 9-13, 2011, Arlington, VA, IEEE, 2011, 3 pgs.

(Continued)

*Primary Examiner* — Jennifer Doan
(74) *Attorney, Agent, or Firm* — Cooley LLP

(57) ABSTRACT

A one-dimensional planar beam forming and steering optical phased array chip is a simple building block of a two-dimensional beam forming and steering solid-state lidar, enabling manufacturing of said lidars at high yield and low cost through the use of a plurality of said chips. Innovative photonic integrated circuit chip architectures that follow design for manufacturing rules enable said building blocks.

20 Claims, 9 Drawing Sheets

(56) References Cited

U.S. PATENT DOCUMENTS

| | | | |
|---|---|---|---|
| 8,203,115 | B2 | 6/2012 | Hochberg et al. |
| 8,311,374 | B2 | 11/2012 | Hochberg et al. |
| 8,731,247 | B2 | 5/2014 | Pollock |
| 8,836,922 | B1 | 9/2014 | Pennecot et al. |
| 8,988,754 | B2 | 3/2015 | Sun et al. |
| 9,014,903 | B1 | 4/2015 | Zhu et al. |
| 9,069,080 | B2 | 6/2015 | Stettner et al. |
| 9,104,086 | B1 | 8/2015 | Davids et al. |
| 9,383,753 | B1 | 7/2016 | Templeton et al. |
| 9,753,351 | B2 * | 9/2017 | Eldada ............... G02F 1/292 |
| 2005/0033497 | A1 | 2/2005 | Stopczynski |
| 2006/0091303 | A1 | 5/2006 | Evans |
| 2006/0091305 | A1 | 5/2006 | Grunnet-Jepsen et al. |
| 2006/0197936 | A1 | 9/2006 | Liebman et al. |
| 2006/0239688 | A1 | 10/2006 | Hillis et al. |
| 2007/0052947 | A1 | 3/2007 | Ludwig et al. |
| 2007/0181810 | A1 | 8/2007 | Tan et al. |
| 2008/0002176 | A1 | 1/2008 | Krasutsky |
| 2008/0094607 | A1 | 4/2008 | Bernard et al. |
| 2008/0186470 | A1 | 8/2008 | Hipp |
| 2008/0204699 | A1 | 8/2008 | Benz et al. |
| 2008/0227292 | A1 | 9/2008 | Miki |
| 2009/0059201 | A1 | 3/2009 | Willner et al. |
| 2009/0251680 | A1 | 10/2009 | Farsaie |
| 2009/0278030 | A1 | 11/2009 | Deliwala |
| 2010/0045964 | A1 | 2/2010 | Jin et al. |
| 2010/0187402 | A1 | 7/2010 | Hochberg et al. |
| 2010/0187442 | A1 | 7/2010 | Hochberg et al. |
| 2010/0253585 | A1 | 10/2010 | Llorens Del Rio et al. |
| 2010/0271614 | A1 | 10/2010 | Albuquerque et al. |
| 2010/0290029 | A1 | 11/2010 | Hata |
| 2011/0216304 | A1 | 9/2011 | Hall |
| 2011/0222814 | A1 | 9/2011 | Krill et al. |
| 2011/0255070 | A1 | 10/2011 | Phillips et al. |
| 2011/0316978 | A1 | 12/2011 | Dillon et al. |
| 2012/0013962 | A1 | 1/2012 | Subbaraman et al. |
| 2012/0226118 | A1 | 9/2012 | Delbeke et al. |
| 2012/0286136 | A1 | 11/2012 | Krill et al. |
| 2013/0027715 | A1 | 1/2013 | Imaki et al. |
| 2013/0044309 | A1 | 2/2013 | Dakin et al. |
| 2013/0114924 | A1 | 5/2013 | Loh et al. |
| 2013/0127980 | A1 | 5/2013 | Haddick et al. |
| 2013/0208256 | A1 | 8/2013 | Mamidipudi et al. |
| 2013/0242400 | A1 | 9/2013 | Chen |
| 2013/0301976 | A1 | 11/2013 | Saida et al. |
| 2014/0152871 | A1 | 6/2014 | Campbell et al. |
| 2014/0211194 | A1 | 7/2014 | Pacala et al. |
| 2014/0240691 | A1 | 8/2014 | Mheen |
| 2014/0376001 | A1 | 12/2014 | Swanson |
| 2015/0192677 | A1 | 7/2015 | Yu et al. |
| 2015/0293224 | A1 | 10/2015 | Eldada et al. |
| 2015/0346340 | A1 | 12/2015 | Yaacobi et al. |
| 2015/0378241 | A1 | 12/2015 | Eldada |
| 2016/0047901 | A1 | 2/2016 | Pacala et al. |
| 2016/0049765 | A1 | 2/2016 | Eldada |
| 2016/0161600 | A1 | 6/2016 | Eldada et al. |

OTHER PUBLICATIONS

Guo et al., "Two-Dimensional optical Beam Steering with InP-Based Photonic Integrated Circuits", IEEE Journal of Selected Topics in Quantum Electronics, vol. 19, No. 4, Aug. 2013, pp. 1, 6, 8, 11.

Hulme et al., "Fully Integrated Hybrid Silicon Free-Space Beam Steering Source with 32 Channel Phased Array", SPIE, Mar. 26, 2014, pp. 898907-2, 898907-13.

Taillaert et al., "An Out-Of-Plane Grating Coupler for Efficient Butt-Coupling Between Compact Planar Waveguides and Single-Mode Fibers", IEEE Journal of Quantum Electronics, vol. 38, No. 7, Jul. 2002, pp. 951-953.

International Search Report and Written Opinion issued to International Patent Application No. PCT/US15/44069, dated Nov. 12, 2015, 9 pgs.

Van Acoleyen, Karel, "Nanophotonic Beamsteering Elements Using Silicon Technology for Wireless Optical Applications", Ghent University, Dept. of Information Technology, Aug. 27, 2012, 180 pgs.

Van Acoleyen, Karel, "Off-Chip Beam Steering with a One-Dimensional Optical Phased Array on Silicon-On-Insulator", Optics Letters, vol. 34, No. 9, May 1, 2009, pp. 1477-1479.

International Search Report and Written Opinion issued to international patent application No. PCT/US15/56516, dated Feb. 4, 2016, 7 pgs.

Guo et al., (2013). "Two-Dimensional optical Beam Steering with InP-Based Photonic Integrated Circuits", IEEE Journal of Selected Topics in Quantum Electronics 19:6100212, 12 total pages.

Jie, S. et al. (2013). "Large-scale silicon photonic circuits for optical phased arrays," IEEE J. Selected Topics in Quantum Electronics 20:1-15.

Extended European Search Report dated Jan. 26, 2018, for EP Application No. 15 830 163.0, filed on Jun. 23, 2015, 10 pages.

* cited by examiner

US 9,964,833 B2

PLANAR BEAM FORMING AND STEERING OPTICAL PHASED ARRAY CHIP AND METHOD OF USING SAME

CROSS REFERENCE TO RELATED APPLICATIONS

This application is a continuation of U.S. application Ser. No. 14/318,716 filed Jun. 30, 2014, the contents of which are incorporated herein by reference.

FIELD OF THE INVENTION

The present invention relates generally to the field of environment sensing, and more particularly to the use of Time of Flight (ToF) lidar sensors for real-time three-dimensional mapping and object detection, tracking, identification and/or classification.

BACKGROUND OF THE INVENTION

A lidar sensor is a light detection and ranging sensor. It is an optical remote sensing module that can measure the distance to a target or objects in a scene, by irradiating the target or scene with light, using pulses (or alternatively a modulated signal) from a laser, and measuring the time it takes photons to travel to said target or landscape and return after reflection to a receiver in the lidar module. The reflected pulses (or modulated signals) are detected, with the time of flight and the intensity of the pulses (or modulated signals) being measures of the distance and the reflectivity of the sensed object, respectively.

Conventional lidar sensors utilize mechanically moving parts for scanning laser beams. In some systems, including certain systems used in automotive applications, such as advanced driver assist systems (ADAS) and autonomous driving systems, it is preferred to use solid state sensors for a variety of potential advantages including but not limited to higher sensor reliability, longer sensor lifetime, smaller sensor size, lower sensor weight, and lower sensor cost.

Radio frequency (RF) delay lines used for the creation of radar phased arrays were used several decades ago for the solid state steering of radar signals. Photonic integrated circuit (PIC) based delay lines combined with detectors and RF antenna arrays were used two decades ago to improve the precision of delays in the solid state steering of radar signals. PICs with microscale and nanoscale devices can be used to produce optical phased arrays (OPAs), comprising tunable optical delay lines and optical antennas, for the solid state steering of laser beams.

Phased arrays in the optical domain that are produced to date are complex, costly and/or have a different purpose than beam forming and beam steering; some combine spatial filters, optical amplifiers and ring lasers (U.S. Pat. No. 7,339,727), some involve a plurality of optical input beams (U.S. Pat. No. 7,406,220), some involve volume diffraction gratings and a plurality of input directions (U.S. Pat. No. 7,428,100), some combine beams of a plurality of wavelengths (U.S. Pat. No. 7,436,588), some have optical phase reference sources and gain elements (U.S. Pat. No. 7,489,870), some have predetermined areas in the field of view and a plurality of beam forming elements (U.S. Pat. No. 7,532,311), and some have multiple frequencies and multiple optical phase reference sources (U.S. Pat. No. 7,555,217).

Two-dimensional beam forming and steering phased arrays in the optical domain that are produced to date have low yields and are costly because they steer in two dimensions with a complex two-dimensional pixel array.

SUMMARY OF THE INVENTION

A one-dimensional (1D) planar beam forming and steering optical phased array chip is a simple building block of a two-dimensional (2D) beam forming and steering solid-state lidar, enabling manufacturing of said lidars at high yield and low cost through the use of a plurality of said chips. Innovative Photonic Integrated Circuit (PIC) chip architectures that follow Design for Manufacturing (DFM) rules enable said building blocks.

DESCRIPTION OF THE DRAWINGS

The following drawings are illustrative of embodiments of the present invention and are not intended to limit the invention as encompassed by the claims forming part of the application.

DETAILED DESCRIPTION OF THE INVENTION

Figure 1:
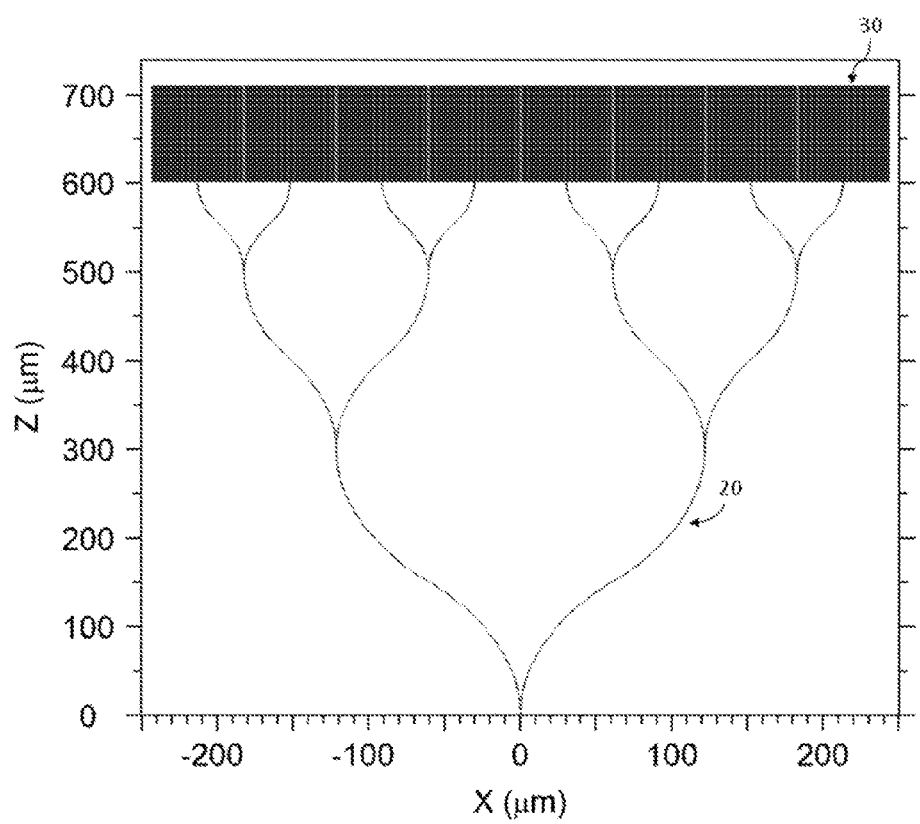
FIG. 1 depicts the splitting section of a 1D planar beam forming and steering optical phased array chip.

The schematic diagram of FIG. 1 depicts the splitting section of a 1D planar beam forming and steering optical phased array chip, said splitting section comprising a 1×L Y-branch tree 20 followed by 1×M multimode interference couplers 30, resulting in a 1×N splitter (where L×M=N, e.g., 8×128=1024).

Figure 2:
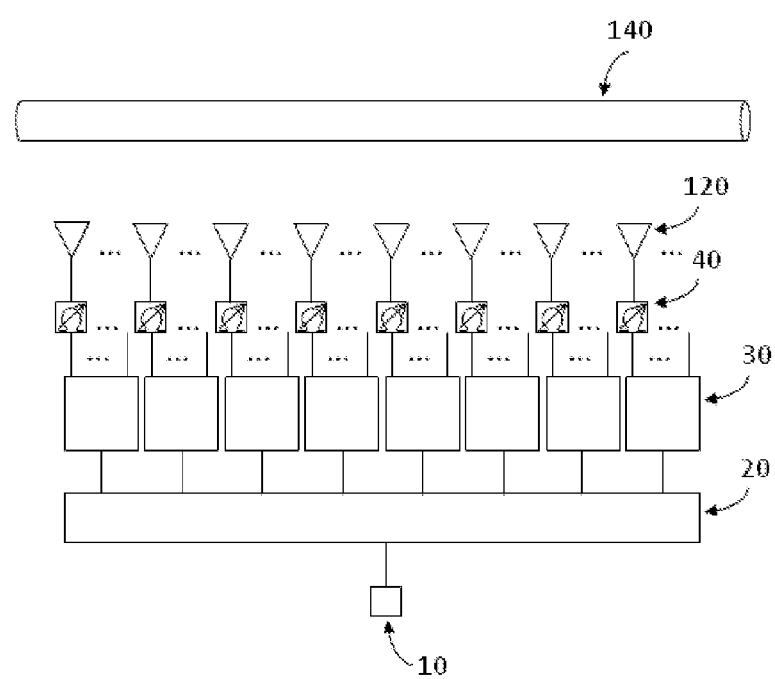
FIG. 2 depicts a 1D planar beam forming and steering optical phased array chip.

The schematic diagram of FIG. 2 depicts a 1D planar beam forming and steering optical phased array chip, said chip comprising a laser 10, a splitting section comprising a Y-branch tree 20 and multimode interference couplers 30, optical phase shifters 40, and out-of-plane optical couplers 120 laid out in a one-dimensional pixel array configuration. A graded-index (GRIN) lens 140 is used to reduce the spot size in the dimension perpendicular to the steering direction. Alternatively, a standard geometric refractive lens, a diffractive optical element (DOE), a holographic optical element (HOE) or an on-chip grating could be used to achieve said spot size reduction.

Figure 3:
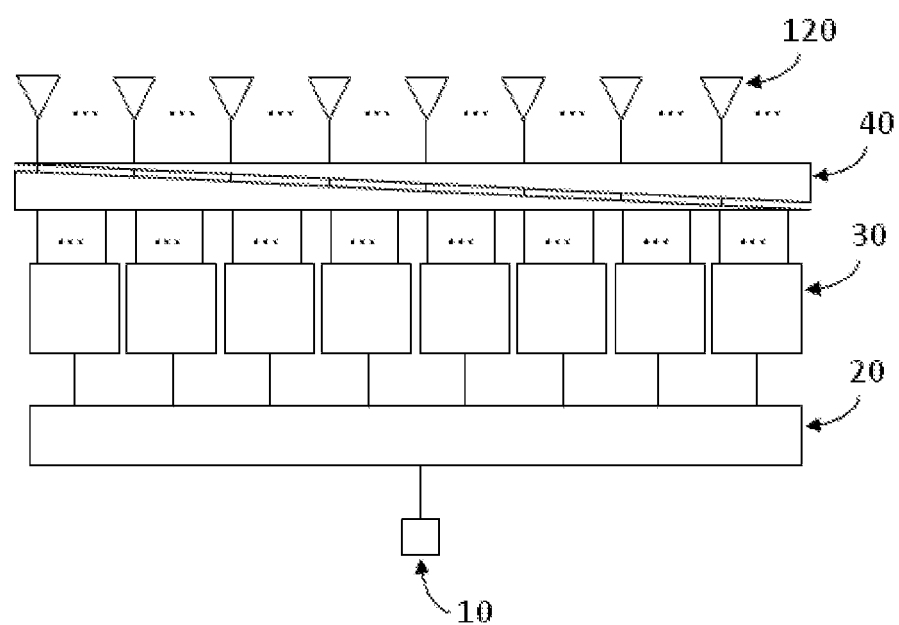
FIG. 3 depicts a 1D planar beam forming and steering optical phased array chip with optical phase shifters in the form of grouped linear ohmic heating electrodes.

The schematic diagram of FIG. 3 depicts a 1D planar beam forming and steering optical phased array chip, said chip comprising a laser 10, a splitting section comprising a Y-branch tree 20 and multimode interference couplers 30, optical phase shifters in the form of two grouped linear ohmic heating electrodes 40 in push-pull configuration, and out-of-plane optical couplers 120.

Figure 4:
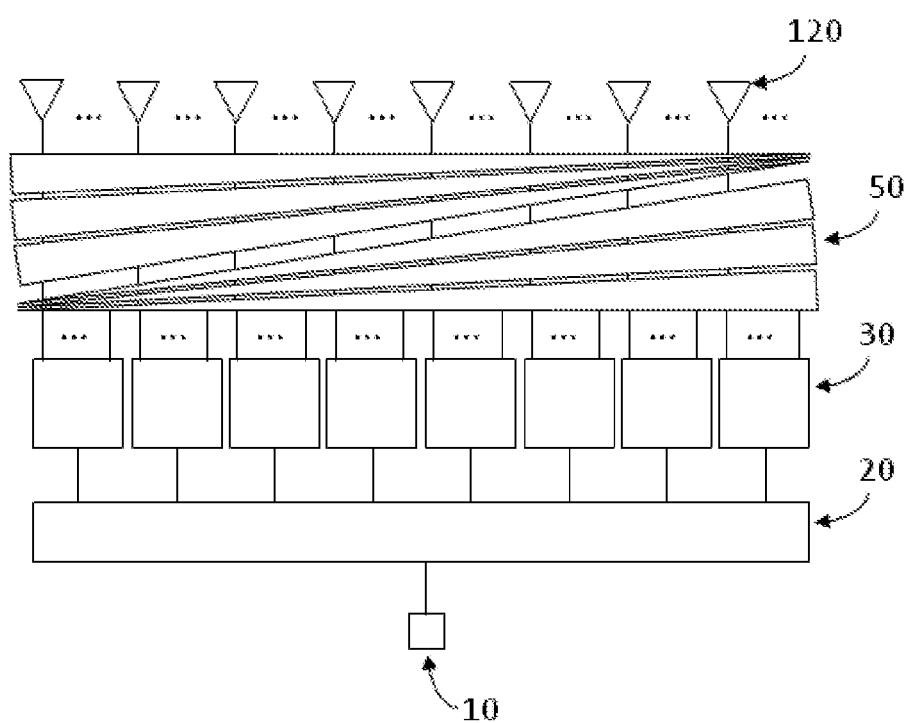
FIG. 4 depicts a 1D planar beam forming and steering optical phased array chip with optical phase shifters in the form of grouped linear ohmic heating electrodes.

The schematic diagram of FIG. 4 depicts a 1D planar beam forming and steering optical phased array chip, said chip comprising a laser 10, a splitting section comprising a Y-branch tree 20 and multimode interference couplers 30, optical phase shifters in the form of two grouped sets of linear ohmic heating electrodes 50 in push-pull configuration, and out-of-plane optical couplers 120.

Figure 5:
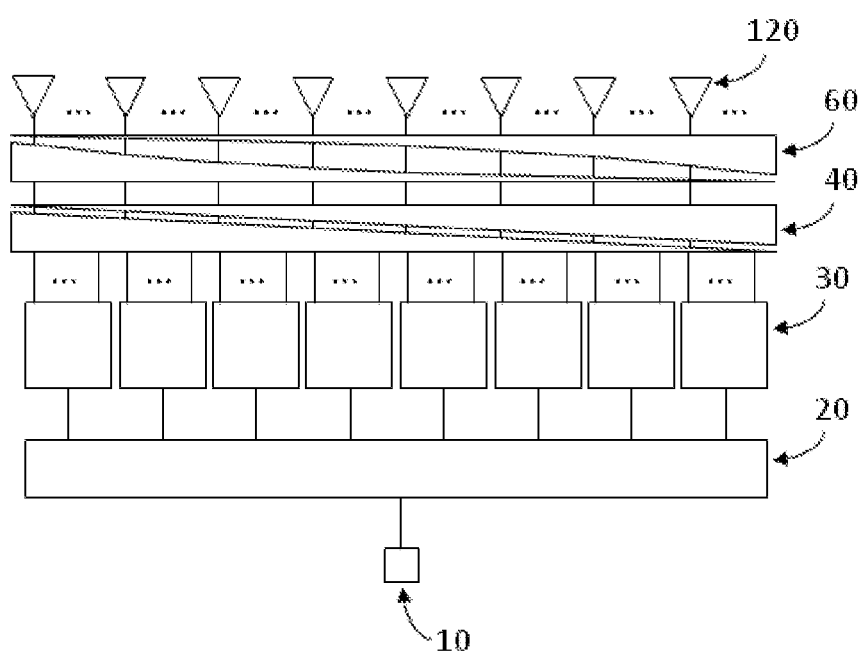
FIG. 5 depicts a 1D planar beam forming and steering optical phased array chip with grouped nonlinear ohmic heating electrodes.

The schematic diagram of FIG. 5 depicts a 1D planar beam forming and steering optical phased array chip, said chip comprising a laser 10, a splitting section comprising a Y-branch tree 20 and multimode interference couplers 30, optical phase shifters in the form of two grouped linear ohmic heating electrodes 40 and optical phase shifters in the form of two grouped nonlinear ohmic heating electrodes 60, both linear and nonlinear heating electrodes bring in push-pull configuration, and out-of-plane optical couplers 120.

Figure 6:
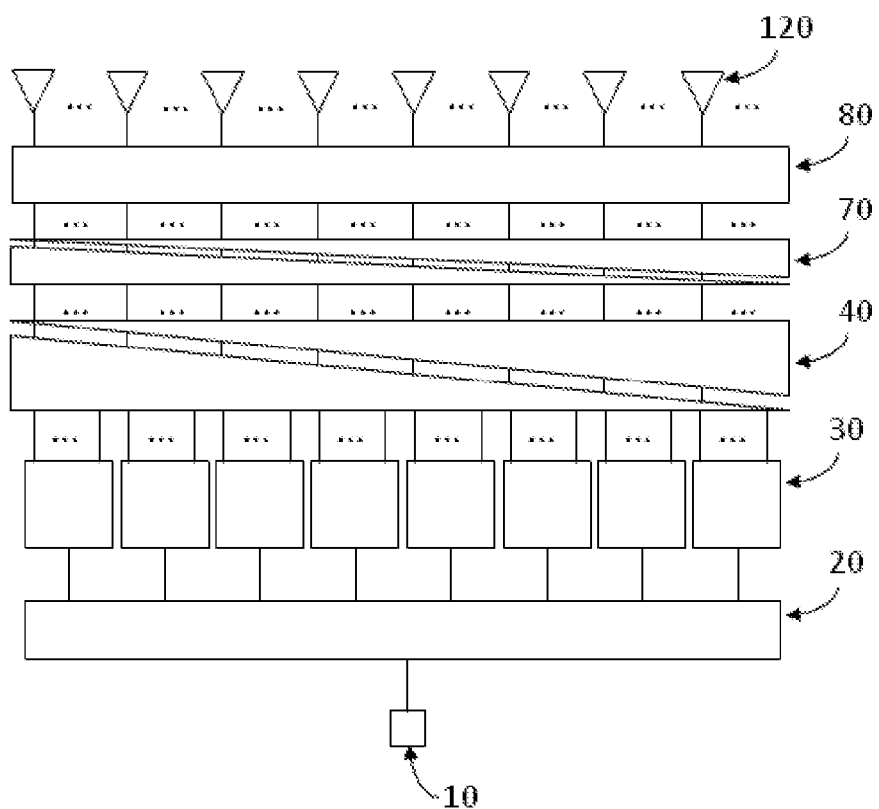
FIG. 6 depicts a 1D planar beam forming and steering optical phased array chip with a phase offset electrode.

The schematic diagram of FIG. 6 depicts a 1D planar beam forming and steering optical phased array chip, said chip comprising a laser 10, a splitting section comprising a Y-branch tree 20 and multimode interference couplers 30, optical phase shifters in the form of two pairs of grouped linear ohmic heating electrodes, one pair 40 used for coarse phase adjustments and one pair 70 used for fine phase adjustments, both said pairs of electrodes bring in push-pull configuration, one phase offset electrode 80, and out-of-plane optical couplers 120.

Figure 7:
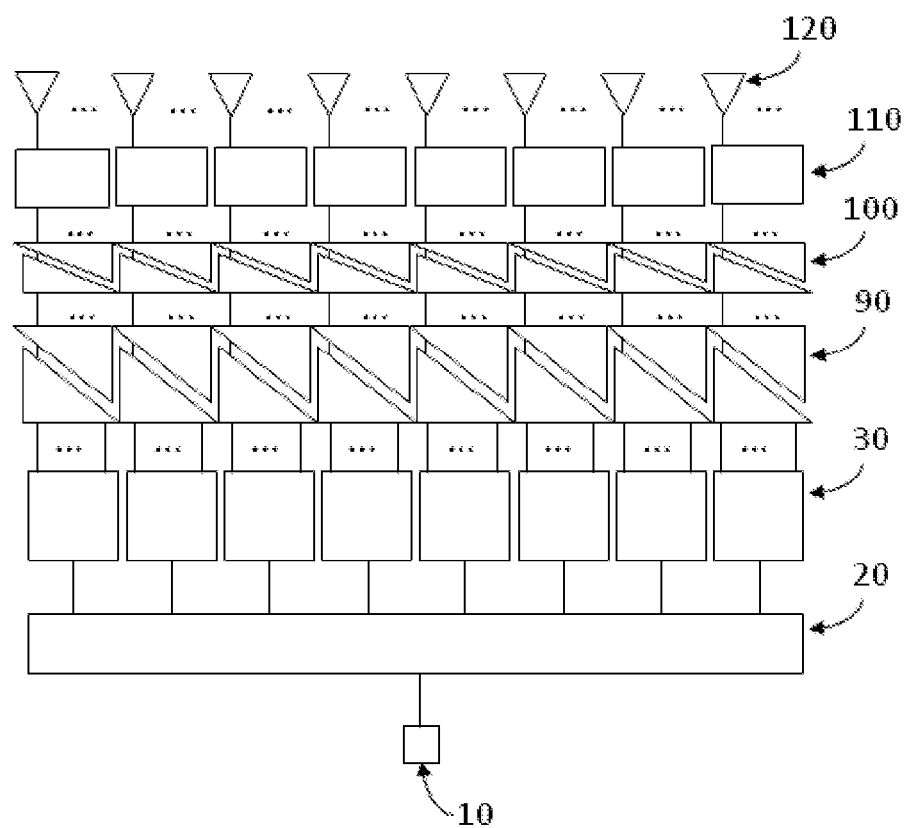
FIG. 7 depicts a 1D planar beam forming and steering optical phased array chip with liner heaters for coarse and fine phase adjustments.

The schematic diagram of FIG. 7 depicts a 1D planar beam forming and steering optical phased array chip, said chip comprising a laser 10, a splitting section comprising a Y-branch tree 20 and multimode interference couplers 30, optical phase shifters in the form of two pairs of grouped linear ohmic heating electrodes, each ohmic heater consisting of linear heaters in series, one pair 90 used for coarse phase adjustments and one pair 100 used for fine phase adjustments, both said pairs of electrodes bring in push-pull configuration, one set of phase offset electrodes 110, and out-of-plane optical couplers 120.

Figure 8:
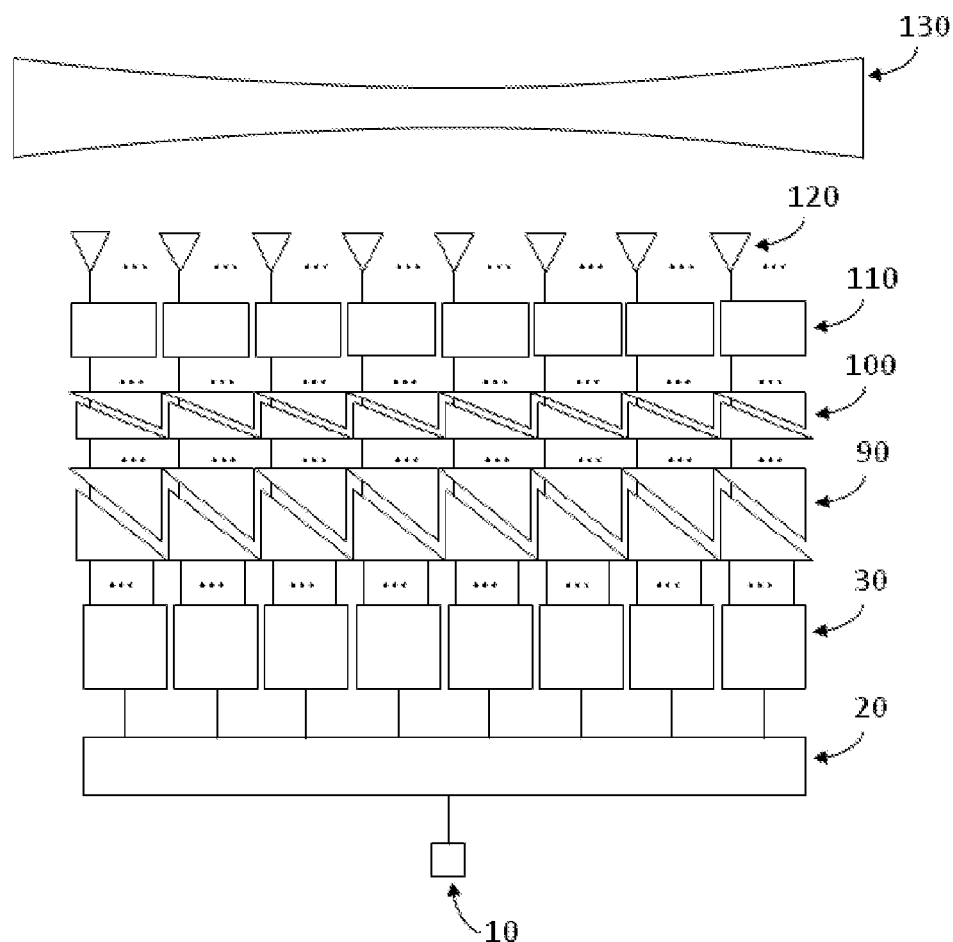
FIG. 8 is similar to the schematic diagram of FIG. 7 with an added concave lens 130 used to extend the steering range.

The schematic diagram of FIG. 8 is similar to the schematic diagram of FIG. 7 with an added concave lens 130 used to extend the steering range.

Figure 9:
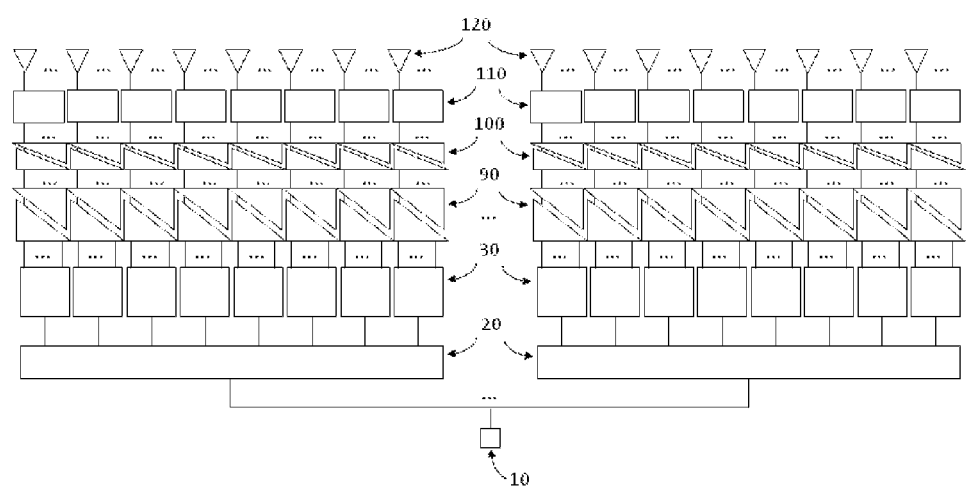
FIG. 9 comprises a plurality of the photonic integrated circuit (PIC) depicted in FIG. 7 with the laser being shared between the two PICs.

The schematic diagram of FIG. 9 comprises a plurality of the photonic integrated circuit (PIC) depicted in FIG. 7 with the laser being shared between the two PICs. Alternatively, each PIC could be supplied with a separate laser.

A lidar-based apparatus and method are used for the solid state steering of laser beams using Photonic Integrated Circuits (PICs). Integrated optic design and fabrication micro- and nanotechnologies are used for the production of chip-scale optical splitters that distribute an optical signal from a laser essentially uniformly to an array of pixels, said pixels comprising tunable optical delay lines and optical antennas. Said antennas achieve out-of-plane coupling of light.

As the delay lines of said antenna-containing pixels in said array are tuned, each antenna emits light of a specific phase to form a desired far-field radiation pattern through interference of these emissions. Said array serves the function of solid state optical phased array (OPA).

By incorporating a large number of antennas, high-resolution far-field patterns can be achieved by an OPA, supporting the radiation pattern beam forming and steering needed in solid state lidar, as well as the generation of arbitrary radiation patterns as needed in three-dimensional holography, optical memory, mode matching for optical space-division multiplexing, free space communications, and biomedical sciences. Whereas imaging from an array is conventionally transmitted through the intensity of the pixels, the OPA allows imaging through the control of the optical phase of pixels that receive coherent light waves from a single source.

A one-dimensional (1D) planar beam forming and steering optical phased array chip is a simple building block of a solid-state lidar, enabling manufacturing of lidars with high yields and at low cost.

The vertical dimension (i.e., the dimension perpendicular to the steering direction) of the spot size is reduced with at least one on-chip grating or at least one off-chip lens.

Types of said off-chip lens include but are not limited to:
  Refractive lens
  Graded-index (GRIN) lens
  Diffractive optical element (DOE)
  Holographic optical element (HOE)

One or a plurality of 1D beam forming and steering circuits can be used to achieve desired horizontal field of view (FOV) or steering range.

Beam spitting is achieved with any subset of beam splitting optical devices, including but not limited to:
  Y-branches
  Directional couplers
  Multimode interference (MMI) couplers A preferred embodiment for beam splitting comprises Y-branch splitters followed by MMI couplers.

Phase shifting controlled with any subset of phase shifting optical devices, including but not limited to:
  Gain elements
  All-pass filters
  Bragg gratings
  Dispersive materials
  Wavelength tuning
  Phase tuning When phase tuning is used, the actuation mechanisms used to tune said delay lines, and said optical splitters when they are tunable, can be any of a variety of mechanisms, including but not limited to:
  Thermo-optic actuation
  Electro-optic actuation
  Electroabsorption actuation
  Free carrier absorption actuation
  Magneto-optic actuation
  Liquid crystal actuation
  All-optical actuation Each pixel can have independent phase control for maximum flexibility and optimal control of the far field radiation pattern, or grouping (sometimes called banding) can be used to provide phase tuning to a plurality of pixels with one control signal for the simplification of the design, fabrication, testing, control and operation.

Grouped phased shifting controlled with any subset of:
  One or plurality of linear (triangular) electrode(s)—serial or parallel; identical or coarse and fine adjustment electrodes
  One or plurality of nonlinear (sublinear or superlinear) electrode(s)—serial or parallel; identical or coarse and fine adjustment electrodes
  One or plurality of phase offset electrode(s) of polygonal shape (e.g., rectangular)—serial or parallel; identical or coarse and fine adjustment electrodes—additive or subtractive; push-push or push-pull configurations.

The optical antennas can be any of a variety of nanostructures that can couple light out of the plane of the PIC, including but not limited to:
Gratings
Holographic optical elements (HOE)
Mirrors
Total internal reflection (TIR) interfaces
Lenses The chip containing the OPA PIC is preferably compatible with a complementary metal-oxide-semiconductor (CMOS) process.

What is claimed is:

1. An apparatus, comprising:
a first optical phased array one-dimensional beam forming and steering integrated circuit with a first field of view steering range adjacent to a second optical phased array one-dimensional beam forming and steering integrated circuit with a second field of view steering range, the first field of view steering range and the second field of view steering range establishing an increased horizontal field of view steering range in a common direction, the first optical phased array one-dimensional beam forming and steering integrated circuit and the second optical phased array one-dimensional beam forming and steering integrated circuit each being a building block of a solid-state lidar, and each including:
at least one optical power splitter, and
at least one optical phase shifter controlled with at least one phase shifting device.

2. The apparatus of claim 1 wherein the at least one phase shifting device is a gain element.

3. The apparatus of claim 1 wherein the at least one phase shifting device is an all-pass filter.

4. The apparatus of claim 1 wherein the at least one phase shifting device is a gain element.

5. The apparatus of claim 1 wherein the at least one phase shifting device is a Bragg grating.

6. The apparatus of claim 1 wherein the at least one phase shifting device is a dispersive material.

7. The apparatus of claim 1 wherein the at least one phase shifting device is a wavelength tuning device.

8. The apparatus of claim 1 wherein the at least one phase shifting device is a phase tuning device.

9. The apparatus of claim 1 further comprising at least one on-chip grating or at least one off-chip lens.

10. The apparatus of claim 9 wherein said at least one off-chip includes but is not limited to: a refractive lens, a graded-index lens, a diffractive optical element and a holographic optical element.

11. The apparatus of claim 1 wherein said at least one optical power splitter is selected from any subset of power splitting optical devices, including but not limited to: Y-branches, Directional couplers, and Multimode interference couplers.

12. The apparatus of claim 11 wherein said at least one optical power splitter has Y-branches followed by multimode interference couplers.

13. The apparatus of claim 1 wherein an actuation mechanism of said at least one phase shifter utilizes a subset of actuation mechanisms, including but not limited to: thermo-optic actuation, electro-optic actuation, electroabsorption actuation, free carrier absorption actuation, magneto-optic actuation, liquid crystal actuation and all-optic actuation.

14. The apparatus of claim 1 wherein each pixel of the pixel array has associated with it an independent phase shifter.

15. The apparatus of claim 1 wherein a plurality of pixels of the pixel array are banded by combined phase shifters.

16. The apparatus of claim 15 wherein the plurality of pixels of the pixel array are banded with control elements, including but not limited to one or a plurality of the following: linear electrodes, nonlinear electrodes, and phase offset electrodes.

17. The apparatus of claim 16 wherein electrodes present in plural quantities are disposed in a manner that is at least one of the following: serial, parallel, additive and subtractive.

18. The apparatus of claim 1 combined with at least one out-of-plane optical coupler achieved with an optical element including but not limited to: gratings, holographic optical elements, mirrors, total internal reflection interfaces and lenses.

19. The apparatus of claim 1 combined with a lensing apparatus to extend the steering range.

20. The apparatus of claim 1 wherein said photonic integrated circuit is compatible with a complementary metal-oxide-semiconductor silicon fabrication process.

\* \* \* \* \*